United States Patent
Friedrich et al.

(10) Patent No.: US 9,133,824 B2
(45) Date of Patent: Sep. 15, 2015

(54) WIND TURBINE AND AN ASSOCIATED YAW CONTROL METHOD

(75) Inventors: Michael Friedrich, Silkeborg (DK); Peter Grabau, Kolding (DK); Carsten Bendix Sørensen, Højbjerg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 512 days.

(21) Appl. No.: 13/537,898

(22) Filed: Jun. 29, 2012

(65) Prior Publication Data

US 2013/0004312 A1    Jan. 3, 2013

(30) Foreign Application Priority Data

Jun. 30, 2011    (DK) .................................. 2011 70342

(51) Int. Cl.
    *F03D 7/02*    (2006.01)
(52) U.S. Cl.
    CPC ....... *F03D 7/0204* (2013.01); *F05B 2270/1095* (2013.01); *F05B 2270/309* (2013.01); *F05B 2270/321* (2013.01); *F05B 2270/326* (2013.01); *Y02E 10/721* (2013.01); *Y02E 10/723* (2013.01)
(58) Field of Classification Search
    None
    See application file for complete search history.

(56) References Cited

U.S. PATENT DOCUMENTS

| | | | |
|---|---|---|---|
| 4,297,076 A | 10/1981 | Donham et al. | |
| 4,815,936 A * | 3/1989 | Stoltze et al. | ..... 416/9 |
| 4,966,525 A | 10/1990 | Nielsen | |
| 6,441,507 B1 * | 8/2002 | Deering et al. | ..... 290/44 |
| 2009/0317250 A1 * | 12/2009 | Gamble et al. | ..... 416/1 |
| 2011/0127772 A1 * | 6/2011 | Fukami et al. | ..... 290/44 |
| 2011/0299986 A1 * | 12/2011 | Yoshida | ..... 416/9 |

FOREIGN PATENT DOCUMENTS

| | | | |
|---|---|---|---|
| CN | 101387267 A | | 3/2009 |
| CN | 101660492 A | | 3/2010 |
| CN | 201554599 U | | 8/2010 |
| CN | 101915208 A | | 12/2010 |
| CN | 101929426 A | | 12/2010 |
| DE | 19739162 A1 | * | 3/1999 |
| EP | 2 314 869 A1 | | 4/2011 |
| JP | 2008-309097 A | | 12/2008 |
| WO | 2008-053017 A2 | | 5/2008 |
| WO | 2008-053017 A3 | | 5/2008 |

* cited by examiner

*Primary Examiner* — Dwayne J White
*Assistant Examiner* — Justin Seabe
(74) *Attorney, Agent, or Firm* — Roberts Mlotkowski Safran & Cole, P.C.; David S. Safran

(57) ABSTRACT

A method of controlling the yawing of two-bladed wind turbine is described. The yaw speed of the turbine is increased when the wind turbine rotor blades are in a substantially vertical position, and the yaw speed may be reduced when the blades are substantially horizontal. By modulating the yaw rate based on the rotational angle of the blades, the effect of the yaw moments on the wind turbine structure is reduced, and the wind turbine may be designed to take into account such reduced forces.

11 Claims, 3 Drawing Sheets

WIND TURBINE AND AN ASSOCIATED YAW CONTROL METHOD

BACKGROUND OF THE INVENTION

1. Field of the Invention

The present invention relates to a two-bladed wind turbine, and an associated method for controlling the yawing action of the wind turbine.

2. Description of Related Art

During wind turbine operation, the wind turbine structure is often exposed to various stresses and strains. The fatigue effects of such stresses must be accounted for during the wind turbine design process, to ensure that the wind turbine itself is able to withstand such strains without undergoing a catastrophic structural failure. This may involve designing wind turbines with considerable structural reinforcement, to prevent breakages or fractures of the structure due to such forces.

Accordingly, it is desirable that methods of operating wind turbines are developed that reduce the magnitude and/or effect of these operational stresses, thereby reducing the structural design requirements for a wind turbine, resulting in a corresponding saving in wind turbine manufacturing effort and cost.

One of the areas where a wind turbine experiences considerable forces is during the yawing of a wind turbine nacelle and rotor to face into the direction of the wind at the turbine. As a wind turbine is yawed, the wind turbine structure experiences a yaw moment due to the effect of yawing or turning the nacelle while the wind turbine blades are in motion. Such moments generate forces in the wind turbine blades, which are required to be dimensioned to withstand the effects of such forces. In addition, it is important that any yawing action is carried out in a fast and efficient manner, in order to reduce any energy losses due to the existence of a yaw error between the wind direction at the turbine and the direction that the wind turbine blades are currently facing.

A known solution to the problem of yaw forces is the use of teether hubs on wind turbines, which allow for the relative movement of the rotor hub on the wind turbine nacelle. However, the use of such teeter hubs on wind turbines involves considerable technical problems during the design stage, as well as increasingly complex service operations.

EP 2 314 869 describes a yaw control system for a wind turbine generator that minimizes the wear of the wind turbine during production and yawing by performing yaw rotation at an earlier stage of change of the wind direction. The yaw control system employs a set of conditions that detects transitional changes in the wind direction for time durations above one of two threshold values, thereby detecting changes faster than nominal wind direction measurements.

SUMMARY OF THE INVENTION

It is an object of the invention to provide a wind turbine and associated control method which reduces forces experienced during yawing actions, resulting in a wind turbine having reduced design requirements and associated costs.

Accordingly, there is provided a method of controlling the yaw motion of a two-bladed wind turbine, the wind turbine comprising a yaw-able nacelle to which a wind turbine rotor is rotatably mounted, said rotor having first and second rotor blades, the method comprising the steps of:

yawing the wind turbine nacelle at a yaw speed to adjust the orientation of the wind turbine rotor blades with the oncoming wind at the wind turbine, wherein the method further comprises the step of:

adjusting said yaw speed based on the rotational position of the wind turbine rotor blades.

The yaw forces experienced by the wind turbine blades vary dependent on the rotational angle of the blades in a two-bladed wind turbine. Accordingly, varying the yawing action (or speed of yawing) based on the rotational position of the blades means that the forces experienced by the wind turbine can be managed more efficiently. (E.g. the rate of yawing can be increased for those rotational angles when the yaw moments are lowest.) Effective control of the yawing system in this manner allows for the blade forces to be minimised, as well as a reduction in the requirements of yaw motors to control such yawing (as the yaw motors are dealing with reduced forces). As a result, the wind turbine design can be tailored to deal with reduced loads, and corresponding savings can be made in the construction of such wind turbines.

Preferably, the method comprises the step of increasing said yaw speed above a base yaw speed when said wind turbine rotor blades are substantially vertically aligned.

When the blades are substantially vertically aligned, the blade yaw moments are reduced to a minimum. Accordingly, yawing the wind turbine at this point results in a reduction in the forces generated in the blade bodies. An increased yaw rate when the blades are substantially vertical accordingly leads to reduced forces in the blades during the wind turbine lifetime.

Additionally or alternatively, the method comprises the step of decreasing said yaw speed below a base yaw speed when said wind turbine rotor blades are substantially horizontally aligned.

Similarly, when the blades are substantially horizontal, the yaw moments experienced by the blades and the forces acting on the blade bodies during yawing are at a maximum. Accordingly, by reducing the rate of yawing for such horizontal positions of the blades, the effects of such forces on the blade structures are minimised.

Preferably, said base yaw speed is approximately 0.5-1 degree/second.

Preferably, said yaw speed is proportionally based on the rotational angle of said wind turbine rotor blades.

In one embodiment, the yaw speed varies with the rotational position of the blades, such that a particular rotational angle may result in a particular yaw speed related to that angle.

Preferably, said yaw speed increases in inverse proportion to the rotational distance of the wind turbine rotor blades from the vertical axis. This means that the yaw speed increases as the rotor blades move from a horizontal position to a vertical position.

Preferably, said yaw speed varies linearly as the rotational angle of the rotor blades varies between a first angle to the horizontal axis and 90 degrees to the horizontal axis. In this embodiment, the rotational position of the blades may have to exceed a threshold angle before the yaw speed of the wind turbine is adjusted.

Additionally or alternatively, said yaw speed decreases linearly as the rotational angle of the rotor blades varies between a second angle to the horizontal axis and 0/180 degrees to the horizontal axis. In this embodiment, the rotational position of the blades may have to be within a threshold angle of the horizontal axis before the yaw speed of the wind turbine is reduced.

It will be understood that the angles referred to may be +/−180 degrees, so that the adjustment of the yaw speed may be performed regardless of which of the blades of a two-bladed wind turbine point upwardly. Furthermore, it will be understood that the first threshold angle may equal the second threshold angle.

Preferably, said yaw speed is at a maximum when said wind turbine rotor blades are vertically aligned, and where said yaw speed is at a minimum when said wind turbine rotor blades are horizontally aligned.

Preferably, the method comprises maintaining a minimum yaw speed when said wind turbine rotor blades are substantially horizontally aligned. Preferably, said minimum yaw speed is between 0.5-1 degree/second.

Depending on turbine construction, it may be preferable to constantly yaw the turbine when there is a yaw error, even when the yaw moments may be at their peak. However, due to the increased yaw rate for the vertical alignment of the blades, the total yaw time will be reduced, resulting in less time that the wind turbine blades are under strain.

Preferably, the method comprises the steps of yawing said nacelle at a first yaw speed when said wind turbine rotor blades are within a first range of rotational angles and yawing said nacelle at a second yaw speed when said wind turbine rotor blades are within a second range of rotational angles.

Preferably, said first range of rotational angles is between +45 degrees to +135 degrees to the horizontal axis, and wherein said second range of rotational angles is between −45 degrees to +45 degrees to the horizontal axis.

Preferably, said first yaw speed is between 1-4 degrees/second. Preferably, said second yaw speed is approximately 0 degrees/second.

By yawing the turbine at an increased yaw speed when the blades are substantially vertical, and preventing yawing when the blades are substantially horizontal, the method of the invention provides a control scheme for a wind turbine which reduces forces experienced by blades during yawing actions, while ensuring that the effect of yaw error on the wind turbine power generation is minimised.

Preferably, the method comprises the step of receiving a predicted wind direction for the oncoming wind at the wind turbine, wherein said step of yawing is performed in response to said predicted wind direction.

The wind turbine may be connected to wind forecasting systems to predict changes in wind direction, and/or detecting devices may be provided at the wind turbine structure to detect changes in wind direction before such changed wind reaches the turbine, e.g. LIDAR (Light Detection And Ranging) systems to detect wind direction.

Preferably, the wind turbine comprises a yaw system having at least one yaw brake and a yaw disk, the yaw brake preventing yawing of the wind turbine nacelle when engaged against said yaw disk, and wherein the method comprises the step of releasing said yaw brake from engagement with said yaw disk to yaw the wind turbine nacelle.

Preferably, the yaw brakes are completely disengaged from the yaw disks in the yaw system, which means that maximum savings may be achieved in the yaw motors which are used in the yaw system.

There is also provided a two-bladed wind turbine comprising:

a wind turbine tower;
a yaw-able nacelle provided at the top of said tower;
a rotor hub comprising first and second rotor blades rotatably mounted on said nacelle; and
a controller operable control the yawing of said nacelle to adjust the orientation of the wind turbine rotor blades with the oncoming wind at the wind turbine, wherein said controller is operable to implement the steps of the above method.

A wind turbine which is operable to implement such a method may be dimensioned to withstand smaller blade forces, as well as reducing the size and cost of yaw motors used to yaw the wind turbine nacelle and rotor.

An embodiment of the invention will now be described, by way of example only, with reference to the accompanying drawings, in which:

DETAILED DESCRIPTION OF THE INVENTION

Figure 1:
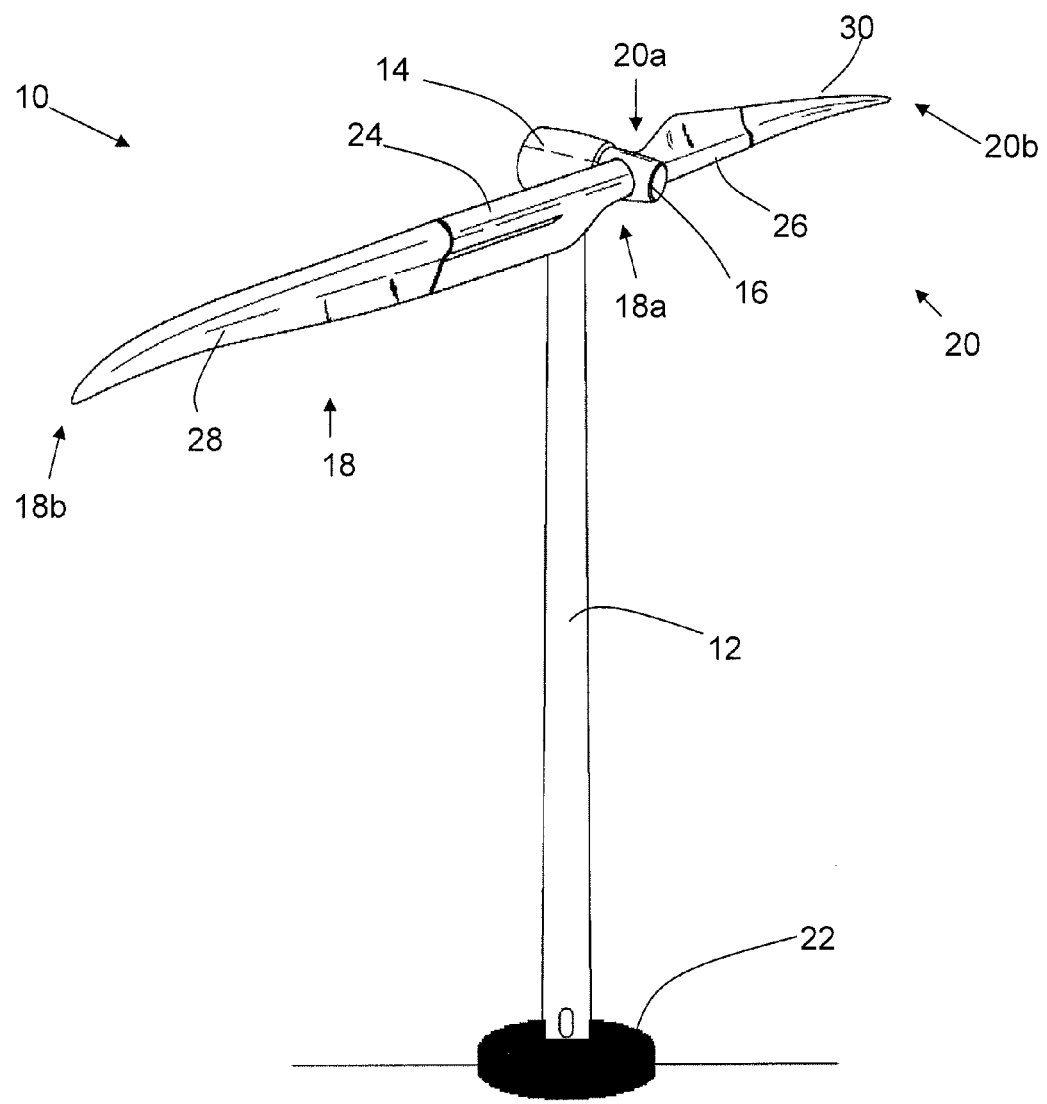
FIG. 1 is a perspective view of a two-bladed wind turbine suitable for use with the method of the invention.

With reference to FIG. 1, a partial-pitch two-bladed wind turbine is indicated generally at 10. The wind turbine 10 comprises a wind turbine tower 12, a nacelle 14 provided at the top of said tower 12, and a rotor hub 16 provided at said nacelle 14. First and second partial pitch rotor blades 18, 20 are provided on opposite sides of said rotor hub 16. The nacelle 14 is coupled to a yaw system (not shown), which is operable to yaw the nacelle 14 (and the associated rotor hub 16 and blades 18, 20) relative to the tower 12 such that the rotor blades 18, 20 face into the direction of the wind at the wind turbine 10.

In FIG. 1, the tower 12 is shown provided on a wind turbine base 22, which may comprise any suitable wind turbine foundation. It will be under-stood that while the illustrated embodiment describes the use of the invention for an on-shore wind turbine, it will be understood that the invention may equally apply to wind turbines for use in an off-shore environment. Similarly, the invention is not limited for use in a partial-pitch wind turbine design, and may be implemented using any suitable two-bladed wind turbine system.

The first and second partial pitch rotor blades 18, 20 each comprise a blade body having a root end 18a, 20a mounted to said rotor hub 16 and a distal tip end 18b, 20b. The rotor blades 18, 20 comprise respective inner blade sections 24, 26 provided at said root ends 18a, 20a, and respective outer blade sections 28, 30 provided at said tip ends 18b, 20b. The rotor blades 18, 20 further comprise a pitch system (not shown) provided in each blade at the junction between the inner blade sections 24, 26 and the outer blade sections 28, 30.

The pitch system is operable to pitch the outer blade sections 28,30 relative to the inner blade sections 24, 26. In FIG. 1, the rotor blades 18 are shown unpitched (i.e. the outer blade sections 28, 30 are pitched at a 0 degree pitch angle).

Figure 2:
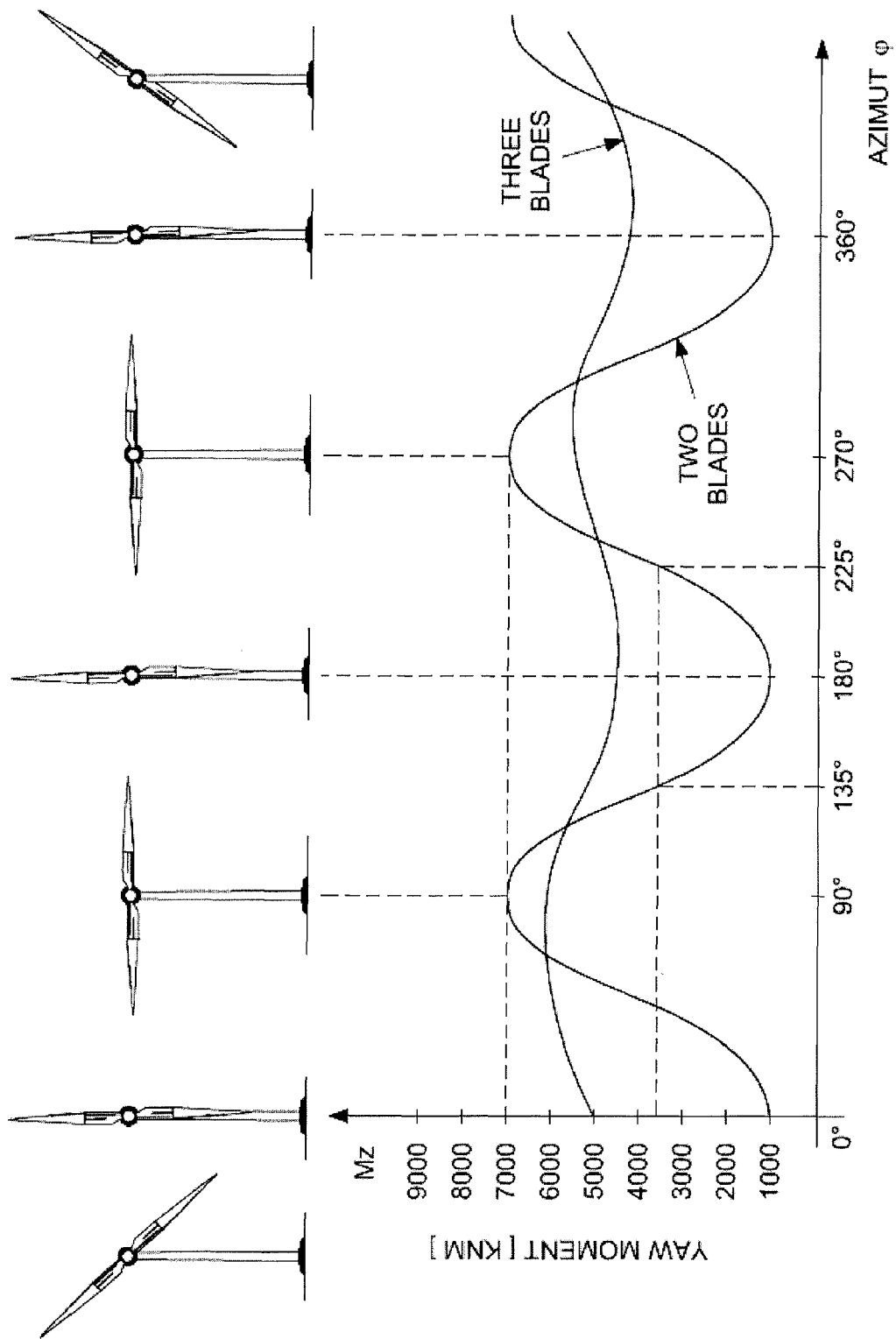
FIG. 2 is an illustration of the yaw moments experienced by a two-bladed wind turbine during rotation of the wind turbine rotor.

With reference to FIG. 2, the yaw moments experienced by a sample two-bladed wind turbine are shown when plotted against the rotation angle of the wind turbine rotor blades (indicated as the azimuth φ). It can be seen that when the blades are in a substantially vertical position (i.e. at 0, 180, 360 degrees to the vertical), the yaw moments are minimised (the moments for the sample turbine shown are approximately 1000 KNM). Similarly, when the blades are in a substantially horizontal position (i.e. at 90, 270 degrees to the vertical), the yaw moments are at a maximum (approximately 7000 KNM for the sample turbine). (By way of comparison, the yaw moments for a sample three-bladed turbine are also shown, which fluctuate about an average of approximately 5500 KNM.)

The yaw moments are largely caused by the deviation of the direction of the wind from the horizontal axis when impacting on the wind turbine blades. This can occur if the wind approaches from an angle slightly negative to the horizontal (i.e. the wind is blowing in a direction coming from the surface level area up towards the wind turbine nacelle, e.g. an updraft). Such deviations may occur due to ground level-related turbulence, etc.

In such situations, the leading edges of the two blades will effectively see the oncoming wind at different angles. This is because of the two wind turbine blades, one leading edge will be substantially facing towards the surface level with the other leading edge substantially facing away from the surface level, for all rotational angles of the blades apart from when are vertically aligned. It will be understood that the same situation applies if the wind turbine is operating in a downdraft situation, i.e. where the wind approaches from an angle slightly positive to the horizontal.

As a result, different forces are experienced on the blades due to their rotation, such forces acting as a yaw moment on the wind turbine structure. While it is shown in the prior art to yaw and/or pitch wind turbine blades to account for other differences in wind direction and force, it is not possible to tilt the wind turbine nacelle and rotor to adjust for such wind direction deviations without complicated and costly hinging or teeter-type structures.

The method of the invention seeks to deal with this problem, by minimising the yawing actions performed when such yaw moments are highest, and/or increasing the yawing action performed when such yaw moments are lowest.

Accordingly, the wind turbine 10 further comprises a controller (not shown) operable to regulate the speed of the turbine yaw system. As the yaw moments (and associated blade flap moments) experienced by the wind turbine 10 varies due to the rotational angle of the rotor blades, the controller varies the rate of yaw of the yaw system based on the rotational angle of the rotor blades, such that the yaw moments experienced by the turbine are reduced. As the turbine operation can be regulated in this manner, the fatigue loads and stresses experienced by the turbine can be reduced with a corresponding reduction in the structural design requirements of the turbine components, and/or the yaw systems implemented in the turbine can be redesigned to account for reduced loading during yawing operations.

Figure 3:
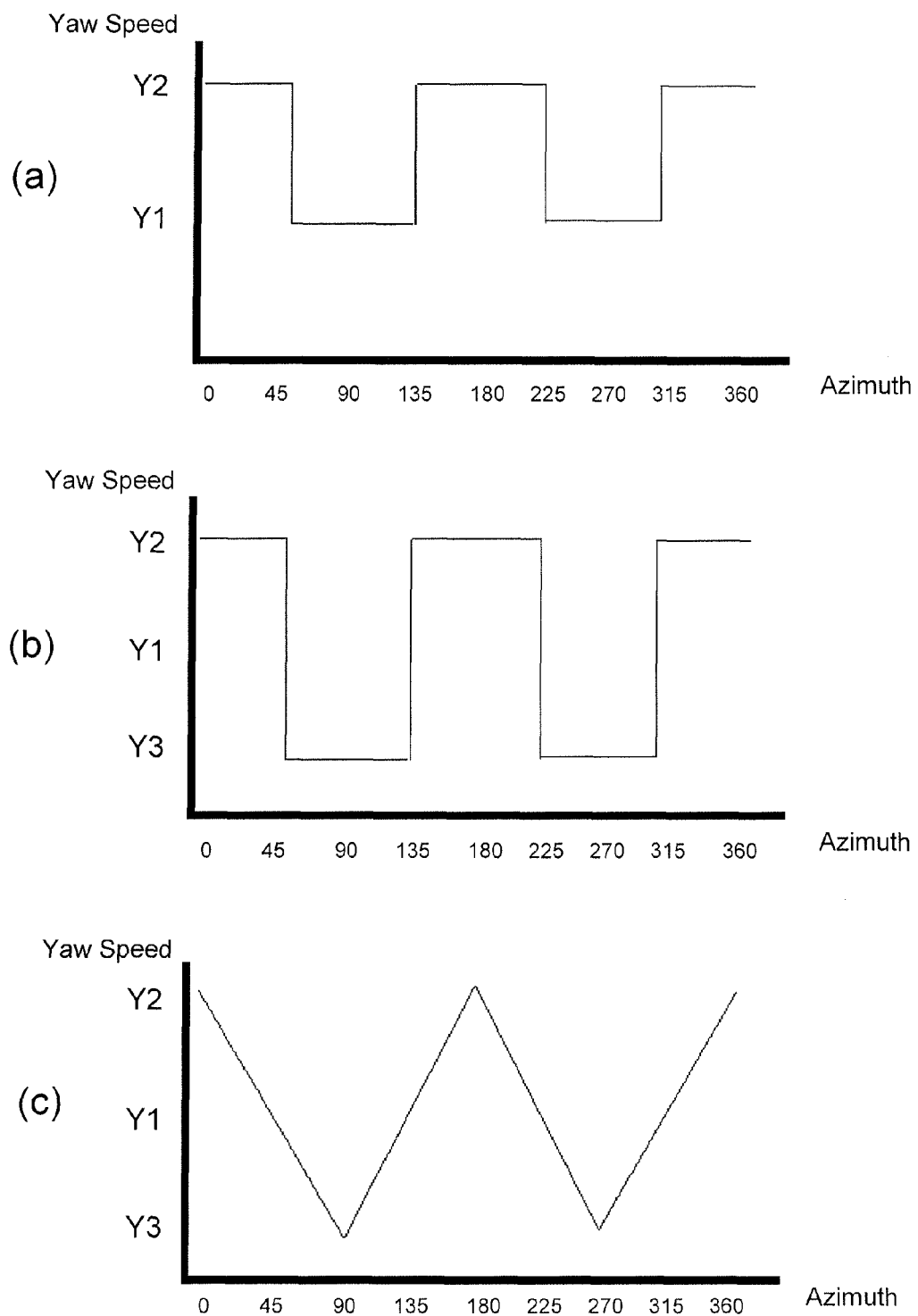
FIG. 3 illustrates the rate of change of yaw speed with respect to the rotational angle of wind turbine rotor blades according to three different embodiments of the method of the invention.

With reference to FIG. 3, plots of the yaw speed against rotor blade azimuth or rotational angle are illustrated for three different embodiments of control method (the azimuth values shown referring to the illustrative diagrams of FIG. 2, where the rotor blades are vertically aligned at 0 degrees, and horizontally aligned at 90 degrees, etc.). It will be understood that the method of the invention is implemented when there is a yaw error at the turbine, i.e. when the wind turbine rotor blades are not aligned with the wind direction at the turbine. (The drawings shown in FIG. 3 are not to scale.)

In FIG. 3(a) it can be seen that, when there is a yaw error, the yaw system of the turbine will always be operated at a rate equal to a base yaw speed Y1. However, in situations where the wind turbine rotor blades are substantially vertically aligned, the rate of yawing is increased to an upper yaw speed Y2. In FIG. 3(a), it can be seen that the relatively faster yawing action is performed for ranges of angles within which the rotor blades are substantially vertical, i.e. between 0 and 45 degrees, between 135 and 225 degrees, and between 315 and 360 degrees to the vertical axis.

This faster yawing speed Y2 ensures that a majority of the yawing action is performed when the blades are substantially vertical, and thereby resulting in less forces experienced by blades of the wind turbine during a yawing action. Furthermore, due to the relatively faster yawing speed (compared to a prior art system which yaws at a constant rate of Y1), this method can reduce the total time (during e.g. 20 years' lifetime) that the turbine is operated in yaw error conditions, thereby improving the power generating efficiency of the turbine.

With reference to FIG. 3(b), a second embodiment of the method of the invention is illustrated. Similar to FIG. 3(a), the yaw system is operated at an upper yaw speed Y2 when the wind turbine rotor blades are substantially vertically aligned. However, when the rotor blades are substantially horizontally aligned, the controller is operable to reduce the rate of yaw of the yaw system below the base yaw speed Y1 to a relatively low yaw speed Y3. In the embodiment demonstrated in FIG. 3(b), the lower yaw speed is activated for when the rotor blades are between 45-135 degrees and 225-315 degrees to the vertical axis.

The advantage of this method is that, while the yawing action might not be completed as fast as in the first embodiment of the invention, the yaw loads in general are reduced due to slower operation of the yaw system at the time of relatively higher yaw moments.

It will be understood that while the embodiment shown in FIG. 3(b) illustrates a single step between operation of the yaw system at the increased yaw speed Y2 and at the lowered yaw speed Y3, other implementation alternatives may be used. For example, the increased yaw speed Y2 may only be selected when the rotor blades are between an angle of +/−20 degrees to the vertical axis, with the lowered yaw speed selected when the rotor blades are between +/−20 degrees to the horizontal axis, with the base yaw speed Y1 selected for any rotational angles outside of these ranges. This would result in a stepped square wave version of the plot of FIG. 3(b).

A third embodiment of the method of the invention is illustrated in FIG. 3(c). Here, the yaw rate is proportional to the rotational angle of the rotor blades, in particular the yaw rate is directly proportional to the angular distance from the rotor blades to the horizontal axis (or inversely proportional to the angular distance from the rotor blades to the vertical axis). Here, the yaw speed gradually changes as part of a triangular waveform from a maximum yaw speed Y2 (when the rotor blades are vertically aligned) to a minimum yaw speed Y3 (when the rotor blades are horizontally aligned).

As the yaw system is constantly changing speed dependent on rotational angle, with a relatively smooth ramping of the yaw speed between Y2 and Y3, there are no sudden jumps in the speed applied by the yaw system, which reduces the wear-and-tear on the yaw system components. This can reduce the need for maintenance, repair and/or replacement operations on the yaw system, thereby improving the overall efficiency of the turbine installation.

It will also be understood that the rate of change of the yaw speed with respect to the rotational angle of the blades may vary over the rotational cycle of the rotor blades, resulting in a plot having different slopes dependent on the rotational angle. Such a variation in the rate of change of yaw speed may further contribute to a smooth operation of the yaw system, with less stresses and strains applied to the yaw system.

While it will be understood that the yaw speeds selected for use in the method of the invention may be dependent on constructional limitations particular to the turbines used, in a preferred version of the embodiments described above, Y1 is equal to a yaw rate of approximately 0.5-1 degree/second, Y2 is equal to a yaw rate of approximately 3-4 degrees/second, and Y3 is equal to a yaw rate of approximately 0 degrees/second.

In a further enhancement of the invention, the turbine 10 may comprise a wind direction detection system, wherein the wind turbine 10 is communicatively coupled to a forecasting system which is operable to detect future changes in the direction of the wind at the turbine. Accordingly, the controller is further operable to yaw the wind turbine in anticipation of such future changes in wind direction, to reduce the time that the turbine spends in a yaw error condition.

Such a detection system may include a remotely based weather forecasting station, and/or a LIDAR (Light Detection And Ranging) system provided on the wind turbine structure (e.g. in the rotor hub of the wind turbine).

It will be understood that the system of the invention is suitable for use with any yaw system for a wind turbine.

In one configuration, the yaw system comprises a yaw brake which is permanently applied to the disks of a yaw system, thereby preventing unwanted yawing of the wind turbine structure. In such a case, the yaw motor is operable to apply a yawing force to overcome the static friction of the brakes, to move the yaw disks relative to one another and to yaw the wind turbine. While the use of the above method in such a yaw system configuration can result in savings in the design of such yaw motors, in this configuration the static friction of the yaw brakes which must be overcome can be of the order of approximately 2000 kN, which means that a based yaw force must be applied to yaw the turbine, regardless of rotational position of the wind turbine blades.

In an alternative configuration, the yaw system may be operable to release the yaw brakes completely from contact with the yaw disks when it is desired to yaw the wind turbine. In this case, the force applied by the yaw motor is completely dedicated to yawing the wind turbine, accordingly through use of the above described method the size and cost of the motor required for the yawing action can be reduced considerably, due to the reduced forces involved in the yawing action.

The above described control method and wind turbine implementing such a control method provides a reduction in the design requirements and costs of wind turbine components, balanced with an improvement in wind turbine performance.

The invention is not limited to the embodiment described herein, and may be modified or adapted without departing from the scope of the present invention.

What is claimed is:

1. A method of controlling the yaw motion of a two-bladed wind turbine, the wind turbine comprising a yaw-able nacelle to which a wind turbine rotor is rotatably mounted, said wind turbine rotor having first and second rotor blades mounted to a hub which defines an axis of rotation around which said wind turbine rotor rotates, the method comprising the steps of:
    yawing the wind turbine nacelle at a yaw speed to adjust the orientation of the wind turbine rotor blades with the oncoming wind at the wind turbine, wherein the method further comprises the step of:
    adjusting said yaw speed based on the rotational position of the wind turbine rotor blades about said axis of rotation when the wind turbine is operating in a power generation mode.

2. The method of claim 1, wherein the method comprises the step of increasing said yaw speed above a base yaw speed when said wind turbine rotor blades are substantially vertically aligned.

3. The method of claim 1, wherein the method comprises the step of decreasing said yaw speed below a base yaw speed when said wind turbine rotor blades are substantially horizontally aligned.

4. The method of any one of claims 1, wherein said yaw speed is proportionally based on the rotational angle of said wind turbine rotor blades.

5. The method of any one of claims 1, wherein said yaw speed is at a maximum when said wind turbine rotor blades are vertically aligned, and where said yaw speed is at a minimum when said wind turbine rotor blades are horizontally aligned.

6. The method of any one of claims 1, wherein the method comprises maintaining a minimum yaw speed when said wind turbine rotor blades are substantially horizontally aligned.

7. The method of any one of claims 1, wherein the method comprises the steps of yawing said nacelle at a first yaw speed when said wind turbine rotor blades are within a first range of rotational angles and yawing said nacelle at a second yaw speed when said wind turbine rotor blades are within a second range of rotational angles.

8. The method of claim 7, wherein said first range of rotational angles is between +45 degrees to +135 degrees to the horizontal axis, and wherein said second range of rotational angles is between −45 degrees to +45 degrees to the horizontal axis.

9. The method of claim 1, wherein the method comprises the step of receiving a predicted wind direction for the oncoming wind at the wind turbine, wherein said step of yawing is performed in response to said predicted wind direction.

10. The method of claim 1, wherein the wind turbine comprises a yaw system having at least one yaw brake and a yaw disk, the yaw brake preventing yawing of the wind turbine nacelle when engaged against said yaw disk, and wherein the method comprises the step of releasing said yaw brake from engagement with said yaw disk to yaw the wind turbine nacelle.

11. A two-bladed wind turbine comprising:
    a wind turbine tower;
    a yaw-able nacelle provided at the top of said tower;
    a rotor hub comprising first and second rotor blades, said hub being mounted on said nacelle so as to be rotatable about an axis of rotation so as to bring said wind turbine blades into various rotational positions; and
    a controller configured to control the yawing of said nacelle to adjust the orientation of the wind turbine rotor blades with the oncoming wind at the wind turbine, at a yaw speed based on the rotational position of the rotor blades about said axis of rotation.

* * * * *